Sept. 9, 1941.  S. C. LYONS  2,255,429
APPARATUS FOR BLUNGING AND DECOLORIZING CLAY OR THE LIKE
Filed July 28, 1937
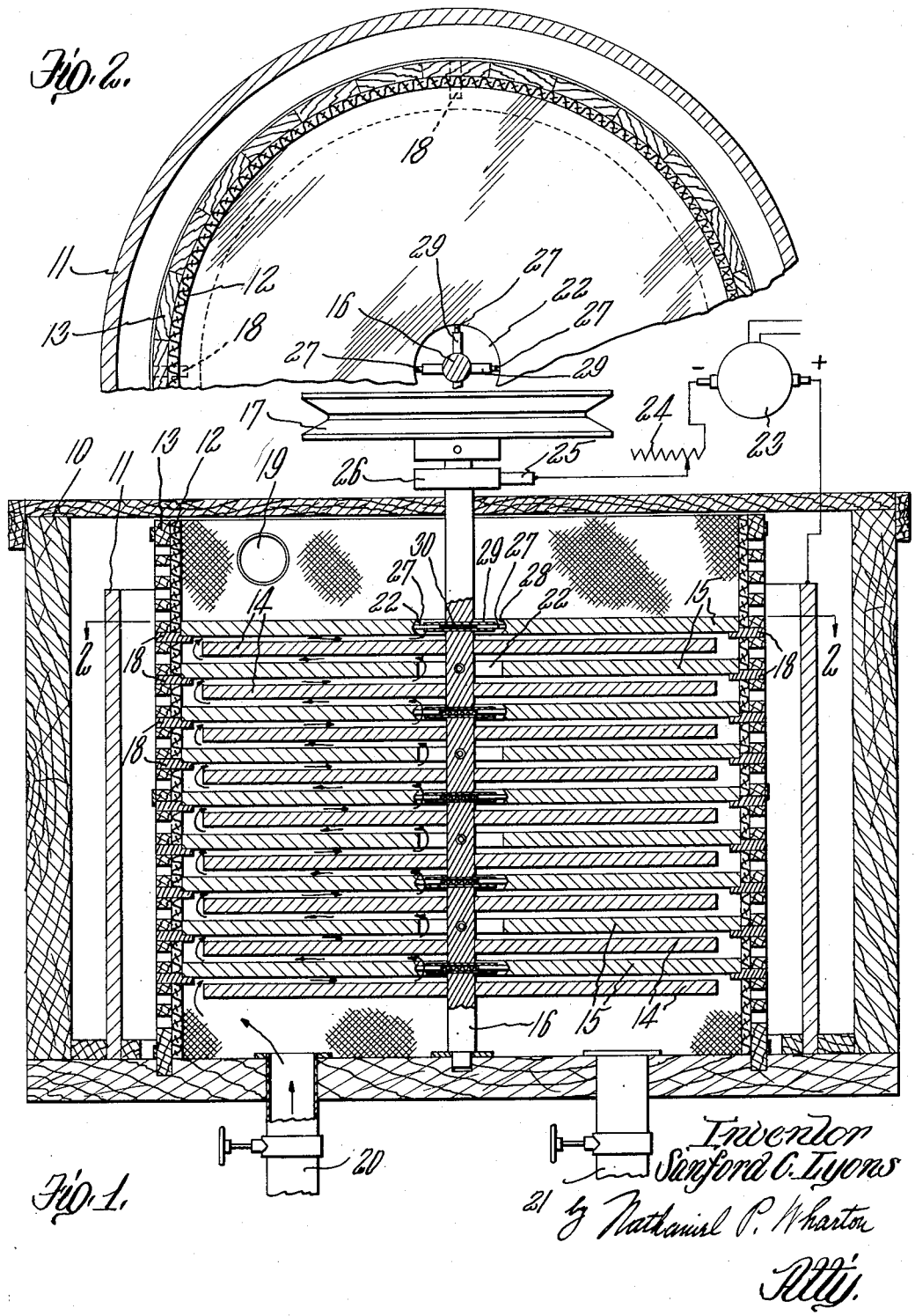

Patented Sept. 9, 1941

2,255,429

UNITED STATES PATENT OFFICE 2,255,429

APPARATUS FOR BLUNGING AND DECOLORIZING CLAY OR THE LIKE

Sanford C. Lyons, Bennington, Vt., assignor to Bird Machine Co., Walpole, Mass., a corporation of Massachusetts Application July 28, 1937, Serial No. 156,138

6 Claims. (Cl. 204—212)

This invention relates to apparatus for blunging and decolorizing clay or analogous earthy materials. Its objective, generally stated, is to make possible a fine particle size suspension or dispersion of clay or the like in water and a simultaneous decolorization of the clay so that the clay may then be recovered from suspension in a form best adapted for various uses, for instance, for use as a filler or coating in paper products, for which latter purpose it is highly desirable that the clay be of fine particle size and of high whiteness or freedom from colored impurities.

In accordance with the present invention, the crude or freshly quarried clay may be broken up roughly or coarsely in water to form an aqueous suspension. Either during the formation of such coarse suspension or afterwards, an electrolyte capable of being electrolyzed to yield nascent reducing agent at a negative electrode or cathode is added to the suspension and the suspension is caused to flow as a stream of small cross-sectional area between one or more pairs of confronting and relatively moving surfaces, at least one surface of a pair being a cathode, clearing each other by a small distance or gap and preferably presenting a large aggregate and/or effective area, in consequence of which such coarse clay particles or aggregates as are present in the suspension are broken down or resolved into smaller particles with simultaneous exposure to cathodic or reducing action of the colored ferruginous and other impurities present in the clay and, accordingly, the decolorization and dissolution of these impurities.

While various electrolytic salts and acids may be used in the aqueous suspending medium so as to develop nascent hydrogen as the reducing or decolorizing agent at the cathode, it is preferable to employ sulphurous acid and/or its salts as the electrolytic media by reason of the fact that the sulphurous acid or sulphite radical is transformed to nascent hyposulphurous acid as well as nascent hydrogen at the cathode and hyposulphurous acid is especially effective in reducing and dissolving the colored impurities associated with crude clay, including ferric oxide, which it reduces and dissolves to form a colorless ferrous salt. It is thus seen that as nascent hyposulphurous acid and/or nascent hydrogen are being generated over the cathode surface or surfaces, the clay particles and their superficial colored impurities are exposed to these nascent reducing or decolorizing agents and are dissolved to form colorless salts. By virtue of the intensive hydraulic shearing forces to which the aggregates or coarse clay particles are subjected as they pass through the narrow clearance between the confronting and relatively moving surfaces, such aggregates are resolved into the ultimate or much smaller clay particles and the reduction and dissolution of the ferric oxide, which is usually the principal colored impurity associated with crude clay, or similar colored impurities is expedited since, as soon as new or fresh films of colored impurities carried on the surfaces of the clay particles are exposed to cathode action by subdivision or shearing of the aggregates or coarser particles, they are immediately reduced and dissolved from the particles as colorless salts.

With the foregoing and other features and objects in view, the present invention will now be described in further detail with particular reference to the accompanying drawing, wherein—

Figure 1 is largely a vertical section through apparatus embodying the present invention.

Figure 2 represents a fragmentary transverse section of the apparatus on the line 2—2 of Figure 1.

The apparatus hereof is shown as comprising a closed, cylindrical wooden vat or tank 10 for holding the various elements that go to make up an electrolytic cell designed to effect a blunging action on clay while the fine clay particles developed by blunging are being exposed to cathodic action. Separated somewhat from the internal wall of the vat is an annular upstanding partition 11 serving as the positive electrode or anode of the cell; and the cathode compartment of the cell may be the cylindrical space defined by a suitable annular permeable diaphragm 12 which is spaced somewhat from the anode 11 and serves to keep the suspended solids and the electrolyte dissolved in the aqueous suspending medium substantially confined to the cathode compartment while permitting the electrolyzing current to complete its circuit through the aqueous medium that seeps through the diaphragm to the anode. A diaphragm consisting of closely woven cotton duck suitably secured to a perforated wooden board backing 13 has proven to be satisfactory, but asbestos paper or other permeable diaphragm material usual in electrolytic cells may be employed.

Within the cylindrical anode space are a series of disc cathodes 14 rotary in a horizontal plane and alternating with a series of stationary disc cathodes 15 also arranged in a horizontal plane, each rotary cathode 14 clearing the confronting adjacent stationary cathode 15 by a small gap or space. The rotary cathodes are shown fixed to a shaft 16 whose lower end is journaled for rotation in the bottom of the vat 10 and whose upper end portion passes out through the top of the vat and terminates as a pulley 17 capable of being belted for rotation to an electric motor or other suitable prime mover (not shown). The circumferential edges of the rotary cathodes 14 are spaced somewhat from the inner face of the diaphragm 12, whereas the circumferential edges of the stationary cathodes 15 extend beyond the rotary cathodes to make substantial contact with the diaphragm 12 and are supported at their edge portions on lugs 18 projecting inwardly from the board backing 13 to which they may be secured.

The topmost disc 15 is shown as being a stationary cathode located sufficiently below the top of the vat to permit clay suspension rising above such disc to be led off from the cathode compartment by way of an overflow pipe 19 for further treatment. The lowermost disc is shown as being a rotary cathode 14 located sufficiently above the bottom of the vat to permit the coarse suspension of crude clay to enter the cathode compartment freely from a valve delivery pipe 20 which opens at the vat bottom. Communicating with the cathode compartment through the vat bottom is a valved discharge pipe 21 through which such mica, sand, and other coarse impurities as tend to settle out and accumulate on the vat bottom may be periodically washed out and through which the vat contents may at any time be discharged.

The coarse suspension of crude clay containing suitable electrolyte dissolved in the aqueous suspending medium flows from the delivery pipe 20 upwardly into the cathode compartment past the edge of the lowermost rotary cathode 14 inwardly through the narrow clearance space between such cathode and the confronting adjacent stationary cathode 15, thence upwardly through a central opening 22 provided in each of the stationary cathodes, thence outwardly through the narrow clearance space between the stationary cathode and the next higher or confronting rotary cathode, again upwardly past the outer edge of such next higher or confronting rotary cathode, and repeats the other paths or directions of flow in passing through the successive clearance spaces between the rotary and stationary cathodes, as indicated by arrow, until it emerges at the top of the topmost disc, whence it escapes through the overflow pipe 19. While the suspension is thus passing in zigzag fashion through the successive narrow horizontal clearance spaces between the alternating rotary and stationary cathode discs, its content of clay aggregates or coarse clay particles is under the intense hydraulic shearing forces exerted by the confronting and relatively moving cathode surfaces, since the rotary cathodes are being rotated at speeds which, when taking into account the diameter of the rotary discs and their spacing from the stationary discs, will produce within the clay "slip" or suspension the desired intensive hydraulic shearing forces already mentioned; and the clay aggregates are hence disrupted or broken up into ultimate or much finer clay particles as a result of the long passage between relatively moving cathode surfaces. While such disruption of the clay aggregates is taking place and fresh clay surfaces carrying coloring impurities are constantly being exposed to the relatively moving cathode surfaces, the coloring impurities are reduced by the nascent hydrosulphurous acid and/or hydrogen being generated at the cathode surfaces to form colorless soluble salts that are promptly dissolved in the aqueous medium, wherefore, by the time the suspension reaches the top of the cathode discs and runs out of the overflow pipe 19, it is a substantially colorless suspension of very fine particle size clay.

The direct current for the electrolyzing circuit may come from a generator 23 whose positive terminal may be wired to the anode 11 and whose negative terminal may be wired by way of a variable rheostat or resistance 24 to a brush 25 making sliding contact with a collar 26 on the shaft 16. The shaft thus conducts the current to the rotary discs 14 fixed thereto. As shown, each disc 15 receives electric current from the shaft 16 through a pair of contact pins 27 whose outer ends engage in a groove 28 formed in the edge of the disc surrounding the central disc opening 22 and which are fitted into a tubular element 29 passing axially through the shaft and containing a compression spring 30 between the inner ends of the pins so as to keep the outer ends of the pins yieldingly engaged in the groove 28. It is to be understood that electric current may be conducted to the stationary cathodes or cathode discs in any other suitable way.

The cathode discs may consist of various electroconductors, such as zinc, aluminum, tin, platinum, etc. Because zinc is of relatively low cost as well as because its salts are colorless, it is considered preferable as the cathode disc material. Moreover, zinc is especially effective in promoting the desired reducing or decolorizing action on the ferric oxide or similar colored impurities associated with clay, possibly by reason of its high electromotive force or some catalytic role played thereby in the decolorizing reaction. Since the anode is stationary and under practically no abrasive or other mechanical stresses, it may be composed of graphite as well as of such materials as may constitute the cathode discs.

It has been found that a rather wide range of voltages may be impressed across the cell hereof with satisfactory results; for instance, voltages as low as about 5 to 30. As will be appreciated by those skilled in the art, the optimum voltage in any particular case will depend upon a variety of factors, such as the spacing or distance between the cathodes and the anode, the concentration of dissolved electrolyte in the clay suspension being treated, etc. In blunging to fine particle size and simultaneously decolorizing clays such as are quarried at or near Dry Branch, Georgia, by the apparatus hereof, I have found that it is possible to get eminently satisfactory results by passing a crude clay suspension of about 35% solids content and containing about 2 to 10 pounds of liquid sulphur dioxide per ton of solids through the apparatus hereof. The sulphur dioxide may be added to the suspension during its coarse blunging treatment or suspension or afterwards as liquid sulphur dioxide, or as sulphurous acid solution, or in gaseous form. It will, of course, be appreciated, that the sulphur dioxide proportion cited is simply illustrative and that more or less sulphur dioxide might be employed, depending upon the content of coloring impurities associated with the particular clay being treated, the particular apparatus hereof in which the treatment is being effected, etc. Besides sulphurous acid, the coarse clay suspension being delivered to the apparatus hereof may advantageously contain a small amount of sulphuric acid, for instance, about ¼ to ½%, based on the solids content of the suspension, as I have found that such small amount of sulphuric acid accelerates the decolorization of the clay, particularly when the clay being treated contains coloring impurities in comparatively large amount in the form of ferric oxide or similar compounds.

As already indicated, a portion of the coarse impurities, such as mica and sand, usually associated with crude clay tends to settle at the bottom of the apparatus hereof as the coarse clay suspension is being reduced to fine particle size and is simultaneously being decolorized therein. The decolorized, fine particle size clay suspension delivered by the apparatus hereof may be put through the usual after-treatments to which decolorized clay suspensions are subjected. Thus, the decolorized clay suspension may be rinsed one or more times with water to wash out substantially completely the colorless water-soluble salts, whereupon residual coarse impurities may be substantially completely removed from the suspension by gravitational settling and/or centrifugal separation. The substantially grit-free decolorized clay suspension may then be treated with alum or other flocculating agent and the clay recovered from suspension in filter presses, as ordinarily. In some instances, however, the clay may be recovered from suspension by electrophoretic centrifugation, as described in my Patent No. 2,057,156, dated October 13, 1936; or the clay may be recovered from suspension as a series of fractions of different particle size, as by the centrifugal fractionating method described in my application Serial No. 89,886, filed July 10, 1936.

The term "clay" as used in the foregoing description and in the appended claims is meant to include not only clay but other earthy or mineral materials capable of being disrupted to finer particle size and being decolorized in aqueous suspension more or less similarly to clay, for instance, such mineral material as calcium carbonate or other water-insoluble fillers or pigments that are precipitated from aqueous solution to form suspensions whose suspended solids are more or less aggregated and carry occlusions of ferric oxide or analogous coloring impurities.

The apparatus hereof is not limited in its utility to the treatment of clay that is merely roughly or coarsely suspended in water but is advantageously applicable to all types of clay suspensions, including clay suspensions that have been preliminarily refined or substantially completely freed from grit as by settling, centrifugation, or the like. When the invention hereof is applied to preliminarily refined clay slurries, for instance, slurries from which coarse and/or otherwise objectionable impurities have been removed and/or which have been washed in the usual manner, the blunging feature of the invention may be of an importance subsidiary to the decolorizing or bleaching feature of the invention. However, even in the case of preliminarily refined and/or washed clay slurries, desired decolorizing or bleaching action may be impeded by the occurrence in the slurries of clay in aggregated or flocculated form; and because the apparatus hereof promotes through intensive hydraulic shearing forces dispersion or individualization in the aqueous medium of the ultimate clay particles occurring therein in aggregated or flocculated form, distinctly better and more uniform bleaching action on the clay is realized because of the exposure of the surfaces of the ultimate clay particles, which might otherwise escape exposure to the reducing and/or bleaching actions, so that such surfaces make direct contact with the bleaching and/or decolorizing reagents in nascent condition. The apparatus hereof is also useful in the treatment of aqueous suspensions of solids, other than clay, for instance, aqueous suspensions of cellulose fiber or wood pulp, in which latter case, not only is individualization or segregation of the cellulose fibers promoted but the fiber surfaces are exposed to the desired bleaching and/or decolorizing actions of nascent bleaching reagents, wherefore, it becomes possible to produce advantageously bleached cellulose fibers or wood pulps. The invention hereof presents another important advantage in that not only does it make possible comparatively rapid decolorization or bleaching action on solids in aqueous suspension but further that it enables generation of decolorizing or bleaching reagents directly in contact with the solids to be bleached while such solids are flowing in aqueous suspension and as a continuously moving stream through the apparatus hereof at a rate comporting with high output of bleached or decolorized suspension with a given size of apparatus.

I claim:

1. Apparatus of the class described consisting essentially of an electrolytic cell provided with a plurality of pairs of relatively rotatable coaxial discs arranged in confronting horizontal planes and clearing each other by a small gap, at least one disc of a pair being a cathode, means for causing relative rotation between said discs, a permeable diaphragm defining and surrounding a cathode compartment in which said discs are located, an anode outside of said compartment, means for introducing liquid to be electrolyzed into the cathode compartment near its bottom, and means for withdrawing electrolyzed liquid from said anode compartment near its top, said discs defining a zigzag path of flow for said liquid introduced near the bottom of the cathode compartment to the top of said compartment and said path of flow including in part the gaps between said discs.

2. Apparatus of the class described consisting essentially of an electrolytic cell provided with a large plurality of relatively rotatable coaxial cathode discs arranged in confronting horizontal planes and including one series of rotary discs and an alternating series of stationary discs clearing each other by a small gap, a common shaft to which said rotary discs are fixed, means for rotating said shaft, a permeable diaphragm defining and surrounding a cathode compartment in which said discs are located, said series of stationary discs being centrally perforated and their circumferential edges substantially abutting said diaphragm and said rotary discs terminating somewhat short of said diaphragm, whereby said two series of discs define a zigzag path of flow for liquid to be electrolyzed from the bottom of said anode compartment to the top of said compartment and said path of flow including in part the gaps between said discs, means for introducing the liquid to be electrolyzed near the bottom of said cathode compartment, and means for withdrawing electrolyzed liquid near the top of said cathode compartment.

3. Apparatus of the class described consisting essentially of an electrolytic cell provided with a succession of pairs of coaxial discs in confronting substantially parallel planes and clearing each other by a small gap through which liquid to be electrolyzed may be passed, alternate discs of said pairs being rotatable relative to adjacent discs and at least one disc of each pair being a cathode, means for causing said alternate discs to rotate relative to adjacent discs, a permeable diaphragm defining and surrounding a cathode compartment in which said discs are located, and an anode outside of said diaphragm.

4. Apparatus of the class described consisting essentially of an electrolytic cell provided with a succession of pairs of coaxial discs in confronting substantially parallel planes and clearing each other by a small gap through which liquid to be electrolyzed may be passed, at least one disc of each pair being a cathode, one of each pair being rotatable and the other disc being stationary, means for causing rotation of said rotatable discs, a permeable diaphragm defining and surrounding a cathode compartment in which said discs are located, and an anode outside of said diaphragm.

5. Apparatus of the class described consisting essentially of an electrolytic cell provided with a succession of pairs of coaxial discs arranged in confronting substantially parallel planes and clearing each other by a small gap to define a path of flow therebetween for liquid to be electrolyzed from one end disc to the other end disc of said succession, alternate discs of said pairs being rotatable relative to adjacent discs and at least one disc of each pair being a cathode, means for causing said alternate discs to rotate relative to adjacent discs, a permeable diaphragm defining and surrounding a cathode compartment in which said discs are located, an anode outside of said compartment, and means for introducing liquid to be electrolyzed into said compartment near one end disc of said succession and for withdrawing electrolyzed liquid therefrom near the other end disc of said succession.

6. Apparatus of the class described consisting essentially of an electrolytic cell provided with a succession of pairs of coaxial discs arranged in confronting substantially parallel planes and clearing each other by a small gap to define a path of flow therebetween for liquid to be electrolyzed from one end disc to the other end disc of said succession, at least one disc of each pair being a cathode and being rotatable and the other disc being stationary, means for causing rotation of said rotatable discs, a permeable diaphragm defining and surrounding a cathode compartment in which said discs are located, an anode outside of said compartment, and means for introducing liquid to be electrolyzed into said compartment near one end disc of said succession and for withdrawing electrolyzed liquid therefrom near the other end disc of said succession.

SANFORD C. LYONS.